United States Patent
Klein

(10) Patent No.: US 10,611,459 B2
(45) Date of Patent: Apr. 7, 2020

(54) CENTRAL WING PANEL FOR A FLYING VEHICLE AND METHOD OF ITS CONTROL

(71) Applicant: Aeromobil, S.R.O., Bratìslava (SK)

(72) Inventor: Štefan Klein, Nitra (SK)

(73) Assignee: AeroMobil, s.r.o., Bratislava (SK)

( * ) Notice: Subject to any disclaimer, the term of this patent is extended or adjusted under 35 U.S.C. 154(b) by 179 days.

(21) Appl. No.: 15/517,545

(22) PCT Filed: Oct. 8, 2015

(86) PCT No.: PCT/SK2015/000004
§ 371 (c)(1),
(2) Date: Apr. 7, 2017

(87) PCT Pub. No.: WO2016/057004
PCT Pub. Date: Apr. 14, 2016

(65) Prior Publication Data
US 2017/0305527 A1    Oct. 26, 2017

(30) Foreign Application Priority Data

Oct. 8, 2014  (SK) .............................. 20123-2014 U
Oct. 8, 2014  (SK) ................................. 50058-2014

(51) Int. Cl.
*B64C 3/56* (2006.01)
*B60F 5/02* (2006.01)
*B64C 37/00* (2006.01)

(52) U.S. Cl.
CPC .................. *B64C 3/56* (2013.01); *B60F 5/02* (2013.01); *B64C 37/00* (2013.01); *Y02T 50/14* (2013.01)

(58) Field of Classification Search
CPC ......... B64C 3/56; B64C 37/00; B64C 23/072; B64C 29/00; B64C 27/52; B64C 3/285;
(Continued)

(56) References Cited

U.S. PATENT DOCUMENTS 2,692,095 A * 10/1954 Carpenter ............... B64C 37/00
244/49
2,940,688 A *  6/1960 Bland ....................... B60F 3/00
114/102.16
(Continued)

FOREIGN PATENT DOCUMENTS

CN        102137768 A        7/2011
CN        102616096 A        8/2012
(Continued)

OTHER PUBLICATIONS

English language abstract for FR 2 577 198 A1, Aug. 14, 1986.
(Continued)

*Primary Examiner* — Medhat Badawi
*Assistant Examiner* — Vicente Rodriguez
(74) *Attorney, Agent, or Firm* — Finnegan, Henderson, Farabow, Garrett & Dunner LLP

(57) ABSTRACT

A central wing panel for a hybrid transportation vehicle for ground and air transportation configured to enable transitioning between an air mode and a ground mode. The central wing panel has a front frame section and a rear frame section connected by one or more cross members. The central wing panel is configured to rotate enabling adjustment of an angle of attack of the vehicle. The rear frame section is configured to rotate enabling coupling and uncoupling of the rear frame section from a first wing and a second wing for transitioning between the air mode and the ground mode. The central wing panel is also configured to allow rotation of ailerons and flaps so that they fold over onto the top front portion of the wings.

16 Claims, 8 Drawing Sheets

(58) Field of Classification Search
CPC ......... B64C 29/0033; B64C 3/18; B64C 1/26; B64C 5/14; B60F 5/02; Y02T 50/14
See application file for complete search history.

(56) References Cited

U.S. PATENT DOCUMENTS

| | | |
|---|---|---|
| 4,881,700 A | 11/1989 | Sarh |
| 7,946,527 B2 | 5/2011 | Holmes |
| 2009/0302151 A1 | 12/2009 | Holmes |
| 2011/0000999 A1 | 1/2011 | Im |
| 2011/0180657 A1* | 7/2011 | Gionta ................. B64C 3/56 244/49 |
| 2012/0032023 A1* | 2/2012 | Bousfield ............. B64C 3/56 244/49 |

FOREIGN PATENT DOCUMENTS

| | | |
|---|---|---|
| FR | 2 577 198 A1 | 8/1986 |
| GB | 556478 | 10/1943 |
| WO | WO 2010/012285 A2 | 2/2010 |
| WO | WO 2010/012285 A3 | 2/2010 |
| WO | WO 2011/014106 A1 | 2/2011 |
| WO | WO 2013/032409 A1 | 3/2013 |

OTHER PUBLICATIONS

International Search Report for International Application No. PCT/SK2015/000004, dated Mar. 30, 2016.
Written Opinion of the International Searching Authority for International Application No. PCT/SK2015/000004.

\* cited by examiner

CENTRAL WING PANEL FOR A FLYING VEHICLE AND METHOD OF ITS CONTROL

RELATED APPLICATIONS

This application is a national stage filing under 35 U.S.C. § 371 of International Application No. PCT/SK2015/000004, filed on Oct. 8, 2015, which claims priority of Slovakian Patent Application No. PP50058-2014, filed on Oct. 8, 2014 and Slovakian Patent Application No. PUV50123-2014, filed on Oct. 8, 2014. The contents of these applications are each incorporated herein by reference in their entirety.

TECHNICAL FIELD

This invention relates generally to a central wing panel for a flying vehicle. One particular use of such central wing panel is for mounting the wings on a hybrid air and ground transportation vehicle.

EXISTING STATE OF ART

Vehicles for ground transportation (e.g., automobiles) and for air transportation (e.g., airplanes) have existed for many years. In more recent years increasing effort has been directed to developing another category of transportation vehicles, that is a hybrid vehicle that is fully compatible with air and normal ground use all in one.

One such hybrid vehicle is the "Terrafugia Transition" described in WO 2007/114877 ("WO '877"). WO '877 publication discloses a vehicle that is both an automobile as well as a two-passenger aircraft, equipped with a four-wheel chassis and foldable wings. The power of the engine on the ground is transferred to the front axle, the wheels being steered by a conventional steering wheel, while in the air the engine spins the propeller positioned at the rear of the vehicle fuselage. The vehicle is equipped with compact wing roots, which are rigidly connected to the fuselage at both sides of the vehicle, and to which the wings are connected through a first hinge mechanism. The first hinge mechanism allows the collapsing of the wings vertically. The axis of rotation for the first hinge mechanism is parallel to a longitudinal axis of the vehicle (i.e., axis of roll). The wings include a second hinge mechanism midway out on the wing enabling collapsing of the outer half of the wing downwards. The axis of rotation for the second hinge mechanism is also parallel to the longitudinal axis of the vehicle.

"AeroMobil" is another hybrid vehicle, described in WO 2013/032409 ("WO '409"). WO '409 also discloses a hybrid vehicle in which the vehicle has a simple cross bar construction for its central wing panel with a single degree of freedom by way of two perpendicular axes of rotation at both ends of the panel. The central wing panel enables retraction of the wings about the axes of rotation.

Both the "Terrafugia Transition" and "Aeromobil" have mechanisms that enable collapsing of the wings, but neither of the mechanism are capable of controlling other wing functions, for example, adjusting angle of attack, adjust ailerons, etc. Therefore, separate independent systems or mechanisms are required which often can increase complexity, cost, and weight of the vehicle.

The solution to these problems provides a central wing panel (i.e. a wing mounting structure) configured for mounting of the wings, transformation (i.e. movement between operating positions), and change of angle of attack.

SUBSTANCE OF THE INVENTION

In a first aspect, a central wing panel for a flying vehicle comprising a body and wings positioned on each side of the body, the central wing panel, comprises: a support structure for connection to the body so as to be substantially aligned with a longitudinal axis thereof; a front transverse member mounted at a front part of the support structure, and a rear transverse member mounted at a rear part of the support structure, wherein the front and rear transverse members each have a substantially horizontal rotation axis perpendicular to the longitudinal axis of the body; a wing support member connected to the front transverse member and rotatable about the axis of rotation of the front transverse member, the wing support member being provided with a wing pivot connectors by which a front part of each wing is connected to the wing support member, each wing being pivotable around a substantially vertical axis of a respective connector between a first wing position in which the wing extends substantially horizontally from the body, and a second wing position in which the wing lies substantially horizontally parallel to the longitudinal axis of the body; a wing locking member connected to the rear transverse member, the wing locking member being movable by rotation about the rear transverse member between a locked position, in which lock segments on the wing locking member engage with corresponding lock segments at a rear part of each wing so as to prevent movement of the wing from the first wing position to the second wing position, and a release position in which the lock segments are disengaged from the corresponding lock segments so as to allow movement of the wing between the first wing position and the second wing position; and an actuator for pivoting the support structure about the rotation axis of the front transverse member so as to adjust the angle of incidence of the wings when in the first wing position.

In a second aspect, a flying vehicle comprises a body and wings positioned on each side of the body, the wings being mounted on the body by means of a central wing panel of the first aspect; and a hybrid transportation vehicle for ground and air transportation comprises: a body, a cabin, a tail, a set of wheels including steerable wheels and driven wheels, an engine, a propeller, and wings positioned on each side of the body, the wings being mounted on the body by means of a central wing panel of the first aspect.

In a third aspect, a method of operating the vehicle of the second aspect, wherein the wings are initially in the first wing position, comprises: rotating the wing locking member from the locked position to the release position; rotating each wing about its respective wing pivot connector between the first wing position and the second wing position; operating the actuator so as to tilt the structure while the wings are moving between the first and second wing positions.

In a fourth aspect, a method of operating the vehicle of the second aspect, wherein the wings are initially in the second wing position, comprises: rotating each wing about its respective wing pivot connector between the second wing position and the first wing position; operating the actuator so as to tilt the structure while the wings are moving between the second and first wing positions; and rotating the wing locking member from the release position to the locked position.

OVERVIEW OF FIGURES ON THE DRAWINGS

The accompanying drawings illustrate embodiments of the central wing panel and methods of operation, where:

Reference will now be made in detail to the non-limiting exemplary embodiments illustrated in the accompanying drawings. Wherever possible, the same reference numbers will be used throughout the drawings to refer to the same or like parts.

THE EXAMPLES OF EMBODIMENTS OF THE INVENTION

Figure 1:
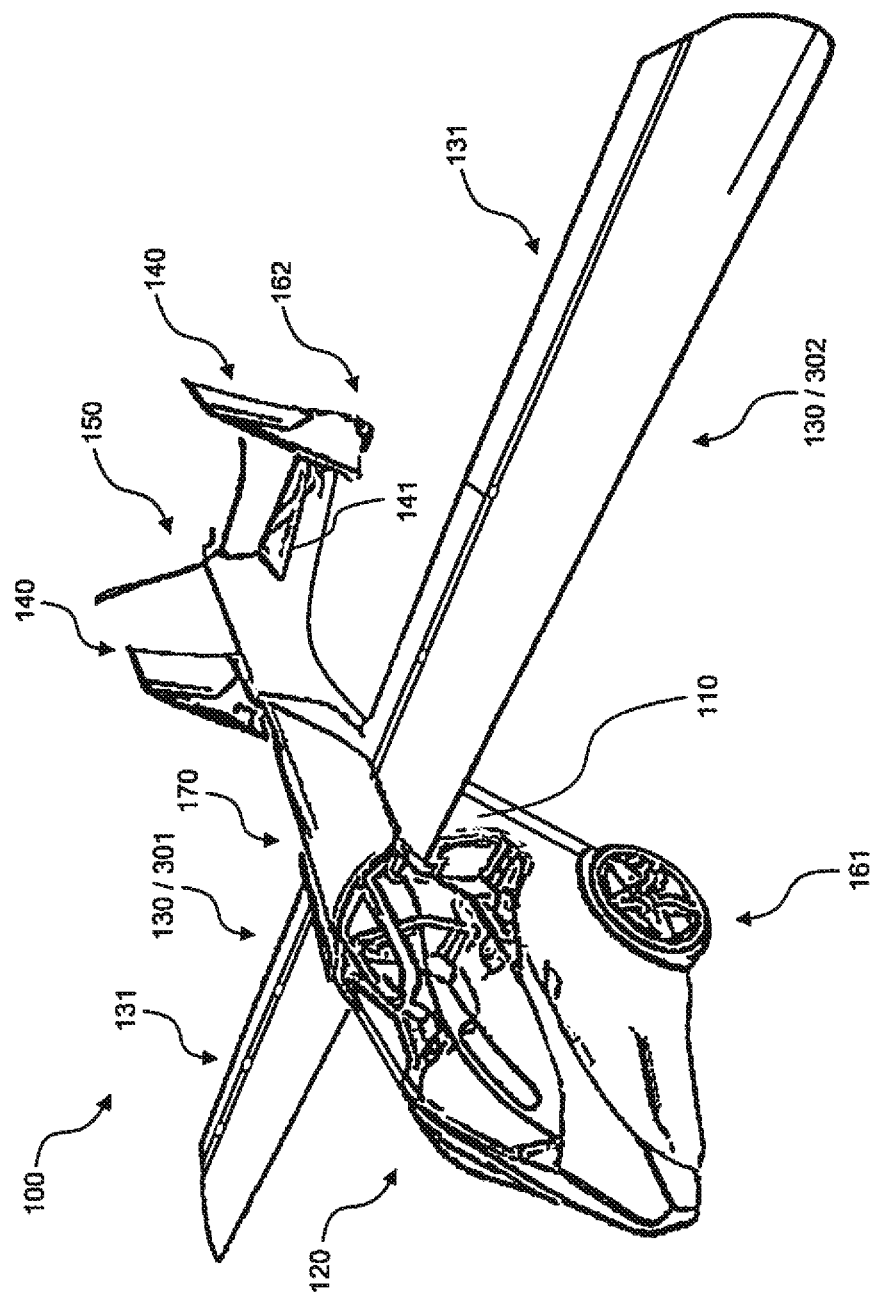
FIG. 1 is side perspective view of one embodiment of a hybrid vehicle configured for air operation.
Figure 2:
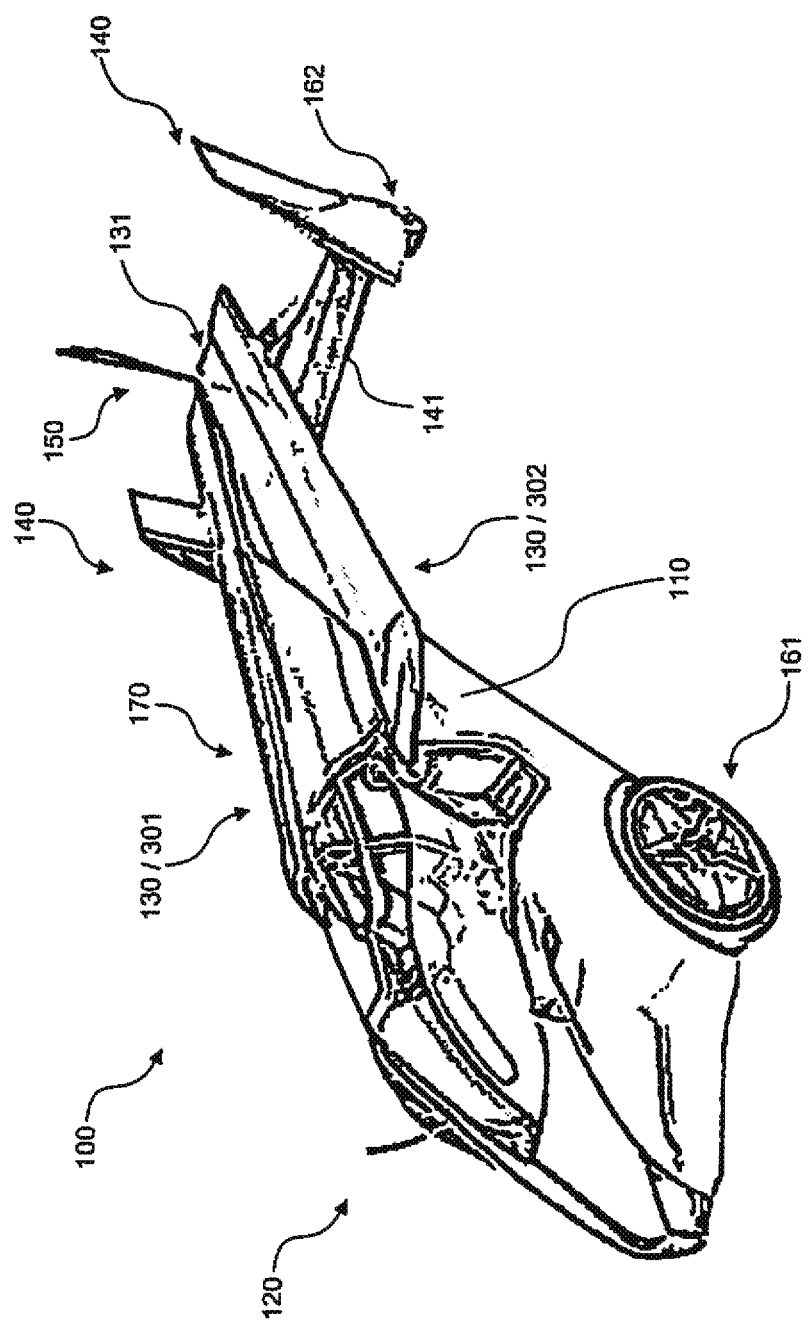
FIG. 2 is a side perspective view of a hybrid vehicle configured for ground operation.

FIGS. 1 and 2 show a hybrid vehicle 100, according to one exemplary embodiment configured for air operation and ground operation respectively. The vehicle 100 is configured for air operation at least during flight, taxiing, takeoff, and landing. The configuration of the vehicle 100 may be transformed from air operation to ground operation or vice versa while on the ground. The vehicle 100 is configured for ground operation while traveling on the ground, for example, driving along roadways.

The vehicle 100 comprises a body 110, a cabin 120, a set of retractable wings 130 (a first wing 301 and a second wing 302), a tail 140, a propeller 150, and wheels, which can include a set of front wheels 161 and rear wheels 162. The vehicle 100 also has a chassis and engine 170 contained within the body 110 configured to drive the propeller 150 (during air operation) or the front wheels 161 or rear wheels 162 (during ground operation).

As shown in FIGS. 1 and 2, the retractable wings 130 include an aileron 131 on each wing 130. Each aileron 131 is attached to a trailing edge of the respective wing 130 by means of a hinge. The ailerons 131 are used to control the rolling of the vehicle 100 about its longitudinal axis when flying, in the usual manner. The tail 140 includes an elevator 141 on each side of the tail 140. The elevators 141 are attached to a trailing edge of each tail section 110 by means of a hinge. The elevators 141 are used to control vehicle 100 pitch when flying, in the usual manner.

The vehicle 100 further includes a central wing panel 300 as shown in FIGS. 3-8. In FIGS. 3-8 only the first wing 301 or the second wing 302 has been shown in each figure to enable better illustration of other components. It is understood that although both wings are not shown in each figure it is intended that all aspects as described herein regarding which ever wing is shown also applies to the other wing not shown.

Figure 3:
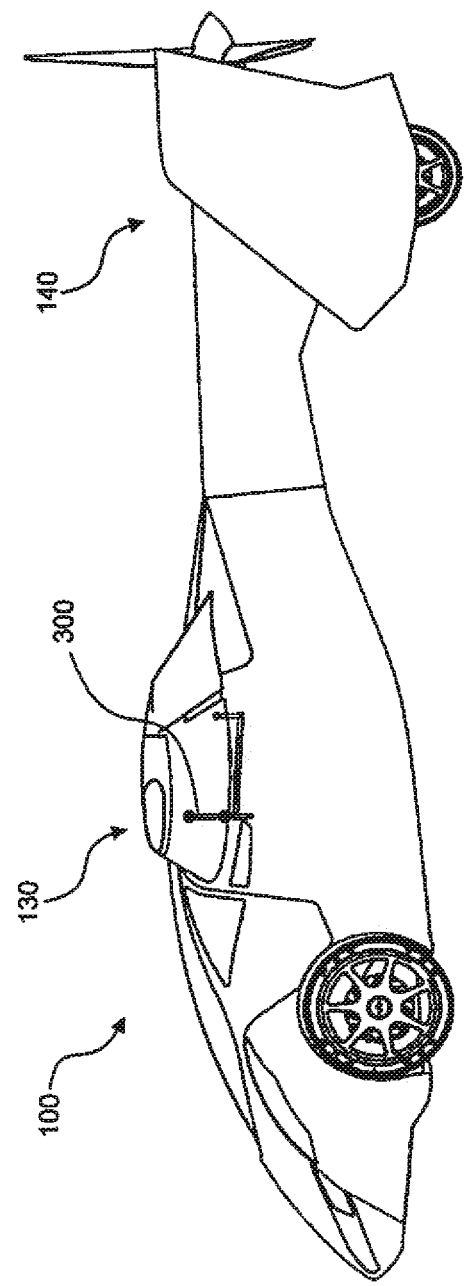
FIG. 3 is a side view of a hybrid vehicle configured for air operation showing a portion of one embodiment of a central wing panel.

The central wing panel 300 is positioned within the body 110 of the vehicle 100 so as to be substantially aligned with its longitudinal axis, for example, as shown in FIG. 3. The central wing panel 300 is coupled to the wings 130 and a structural frame (not shown) of the vehicle 100 that may be contained within the body 110. The central wing panel 300 can be configured to allow adjustment of the wings 130 about multiple axes.

Figure 4:
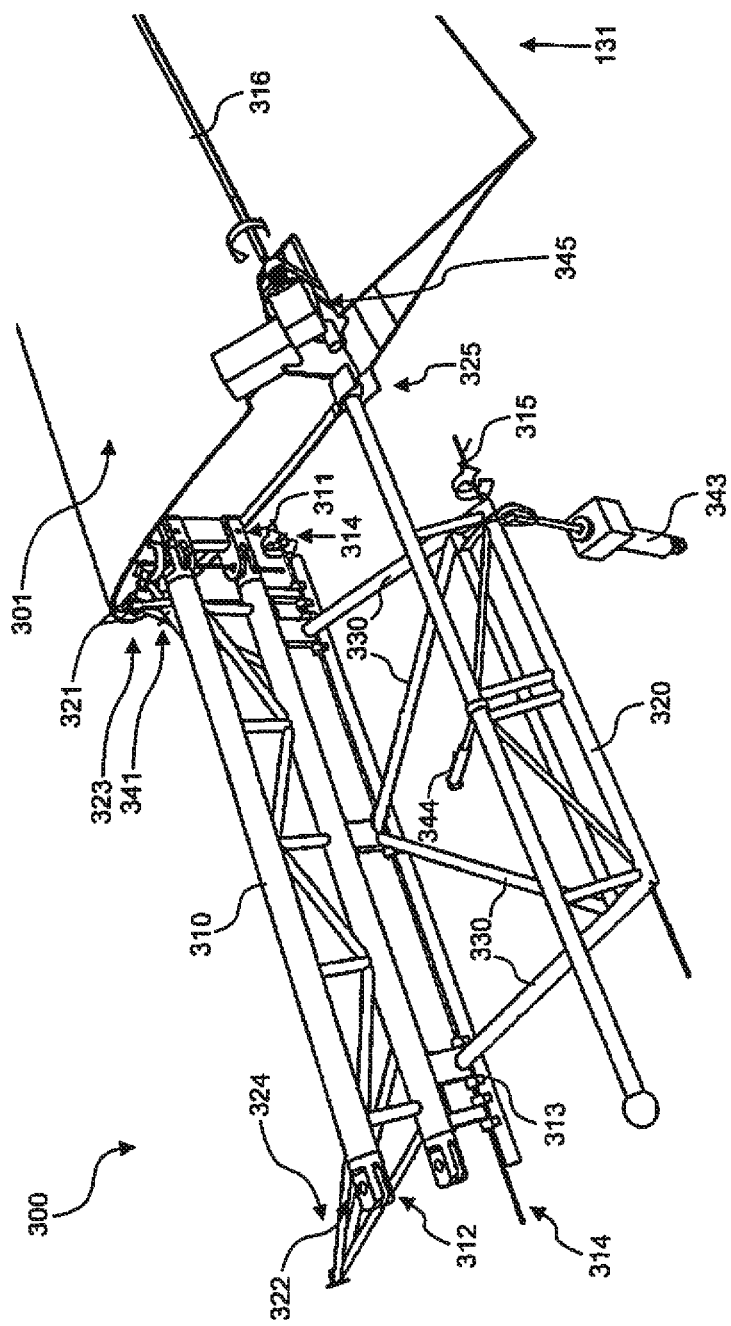
FIG. 4 is a portion of one embodiment of a central wing panel.
Figure 5:
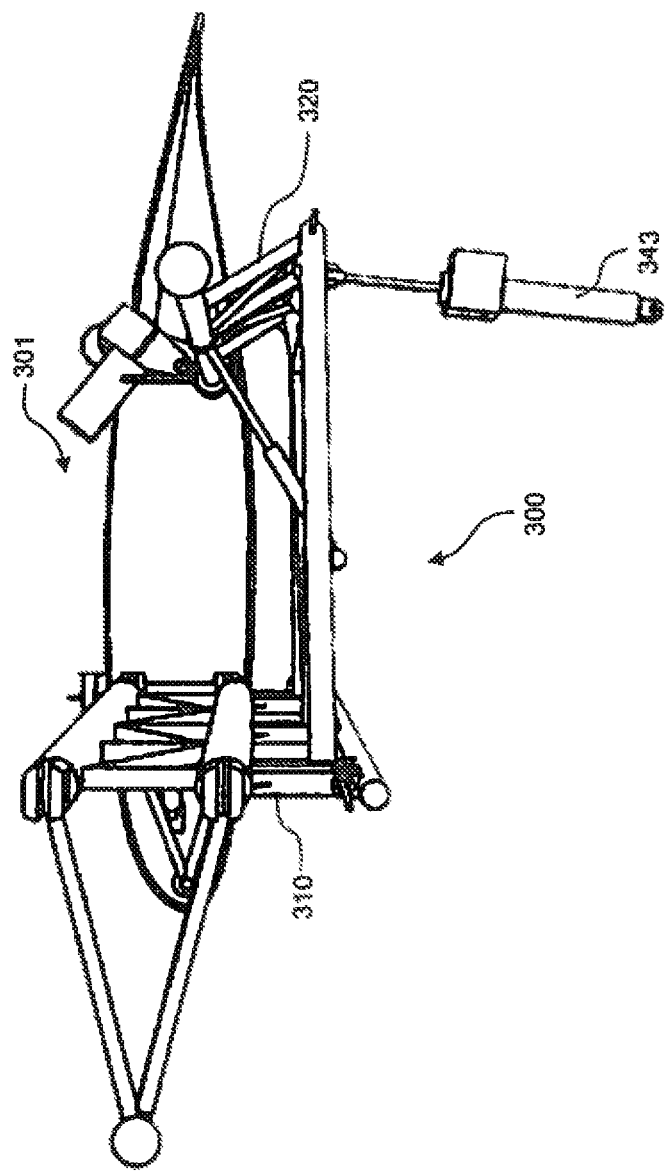
FIG. 5 is a portion of one embodiment of a central wing panel.
Figure 6:
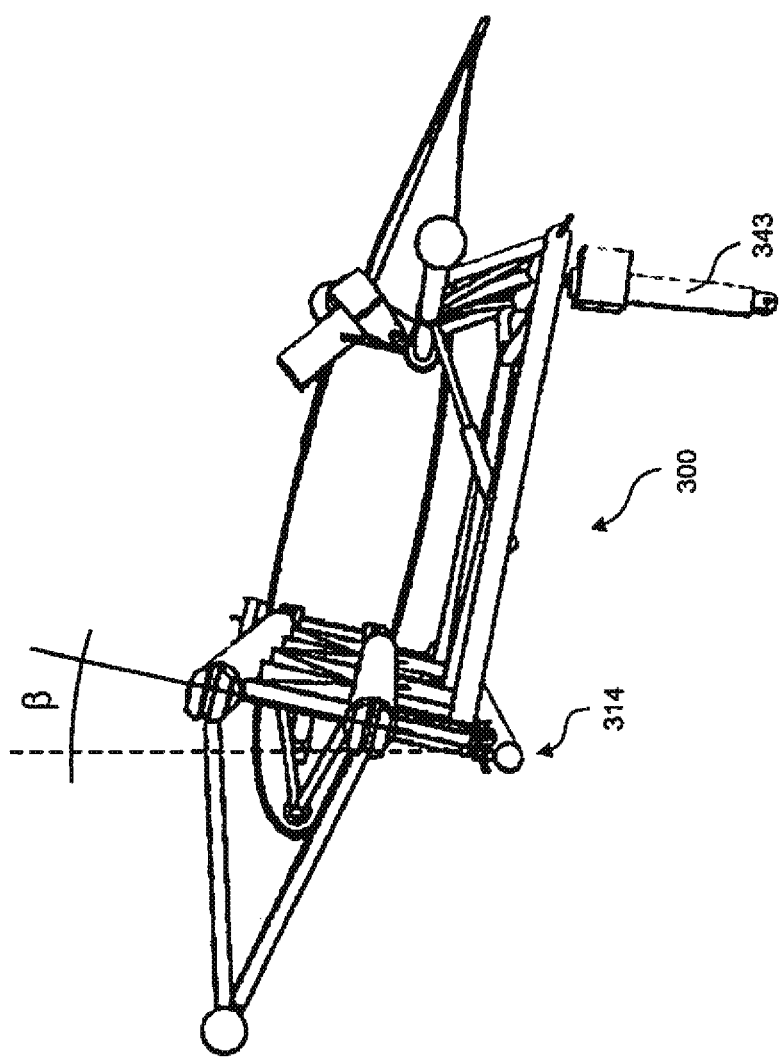
FIG. 6 is a portion of one embodiment of a central wing panel.

FIG. 4 shows an exemplary embodiment of the central wing panel 300. The central wing panel 300 has a front frame section 310 including a front transverse member and a wing support member, and a rear frame section 320 including a rear transverse member and wing locking member, that are connected by one or more cross members 330. The front frame section 310 and the rear frame section 320, as shown in FIGS. 4-6 have a plurality of vertical, horizontal, and diagonal members interconnected.

As shown in FIG. 4, the front frame section 310 is rotatably coupled to front parts of the first wing 301 and the second wing 302 (not shown in FIG. 4) by means of wing pivot connectors. The front frame section 310 has a pair of hinge mechanisms 311 and 312 vertically oriented and positioned at opposite ends. A first vertical axis 321 and a second vertical axis 322 are formed by the hinge mechanisms 311 and 312. The first wing 301 and the second wing 302 are configured to rotate about the first vertical axis 321 and the second vertical axis 322. The front frame section 310 includes stoppers 323 and 324 that extend toward the front portion of the first wing 301 and the second wing 302, as shown in FIG. 4. Stoppers 323 and 324 are configured to restrict rotation of the first wing 301 and the second wing 302 beyond parallel in the forward direction (i.e. an extended position). Rotation of the first wing 301 and the second wing 302 about the first vertical axis 321 and the second vertical axis 322 is a part of the transition between air operation mode (see FIG. 1) and ground operation mode (see FIG. 2) for the vehicle 100.

The first wing 301 and the second wing 302 are configured to be rotated about first vertical axis 321 and second vertical axis 322 by one or more actuator mechanisms. For example, the central wing panel 300 includes a first actuator 341 connected to the front frame section 310 and linked to the first wing 301, as shown in FIG. 4. The first actuator 341 is configured to extend or contract causing rotation of first wing 301 about first vertical axis 321. The central wing panel 300 includes a second actuator 342 (not shown) connected to the front frame section 310 and linked to the second wing 302 (not shown) configured to cause rotation of the second wing 302 about the second vertical axis 322.

The front frame section 310 is rotatably coupled to the structural frame of the vehicle 100. For example, a lower member defining a front transverse member 313 of the front frame section 310 can be coupled to the structural frame of the vehicle 100 such that a first horizontal axis 314 substantially parallel to the member 313 is formed. The central wing panel 300 is configured to rotate about the first horizontal axis 314 as shown in FIG. 4.

The central wing panel 300 rotates about the first horizontal axis 314 by one or more actuator mechanisms. For example, the central wing panel 300 can include a third actuator 343 coupled to the central wing panel 300 at one end and coupled to the structural frame (not shown) of the vehicle 100. As shown in FIG. 4, the third actuator 343 is coupled to a lower portion of the rear frame section 320. It is contemplated that in other embodiments additional actuators can be used to drive rotation of the central wing panel 300 about the first horizontal axis 314.

FIG. 5 shows third actuator 343 at least partially extended so that first wing 301 is substantially horizontal. In FIG. 6, the third actuator 343 is retracted causing the central wing panel 300 to rotate about the first horizontal axis 314 an angle β. Angle β can be, for example, about 0 to 15 degrees.

Figure 7:
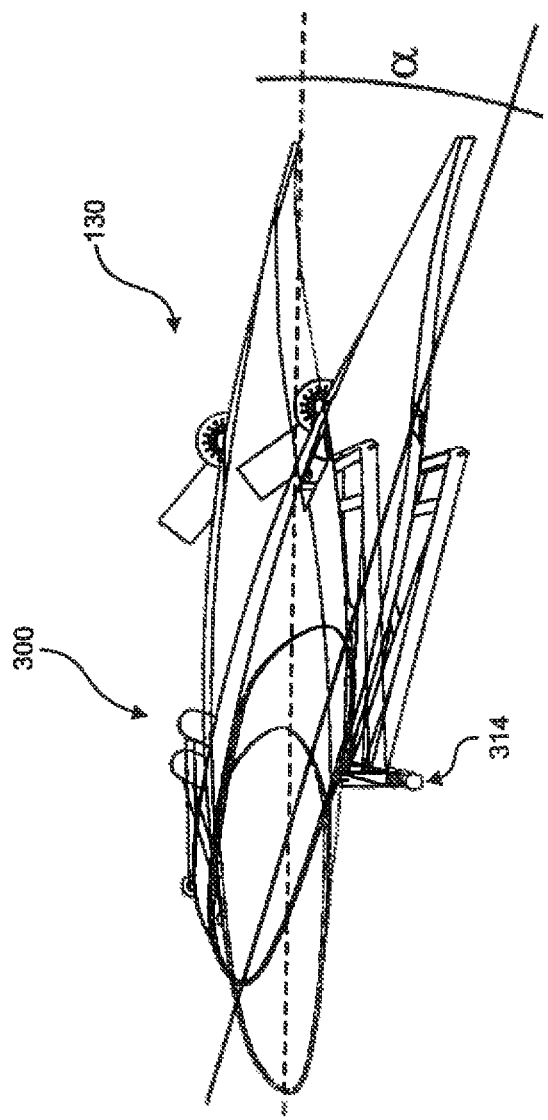
FIG. 7 is a portion of one embodiment of a central wing panel.

FIG. 7 shows rotation of the central wing panel 300 about the first horizontal axis 314 by the third actuator 343 (not shown), which enables adjustment of the incidence of the wings relative to horizontal by an angle α. Angle α can be, for example, about 0 to 15 degrees and can correspond with angle β. Angle α represents the angle of attack for the wings of the vehicle 100 in flight. Therefore, by way of the third actuator 343, an operator of the vehicle 100 is able to adjust the incidence of the wing while operating in the air. As is known in the art, adjusting the angle of attack is advantageous because the angle of attack affects the amount of lift produced by the wings. For take-off and landing it is advantageous to increase the angle of incidence of the wing to increase the angle of attack and increase lift at low speeds. By increasing lift, the distance needed for take-off is reduced allowing for use of shorter runways and similarly the distance needed for landing can also be reduced. While in the air (e.g., not landing or taking off), the angle of incidence can be decreased to reduce drag and increase air speed when flying at normal attitudes.

The central wing panel 300 also is configured such that the first wing 301 and the second wing 302 rotate about the first vertical axis 321 and the second vertical axis 322 while the central wing panel 300 is rotated or has been rotated about the first horizontal axis 314. These two separate axis of rotation can enable the outer ends of the first wing 301 and the second wing 302 to be elevated above the tail 140 during the transition between air operation mode and ground operation mode. For example, as shown in FIG. 3, if wings 130 are retracted back and remained substantially parallel to the ground, they will strike the tail 140 unless they are sufficiently short. However, the central wing panel 300 enables the wings 130 to be elevated above tail 140 when retracting or opening to avoid interference.

As shown in FIG. 4, the rear frame section 320 is coupled to the first wing 301 and the second wing 302 (not shown). The rear frame section 320 is rotatably releasably coupled to the first wing 301 and the second wing 302 by way of a hinge joint 325. The hinge joints 325 comprise a ball attached to a member of the rear frame section 320, and a "U" shaped pocket configured to receive the ball, the ball and socket defining lock segments. The hinge joints 325 are configured to restrict the movement of the first wing 301 and the second wing 302, as shown in FIG. 4. For example, the first wing 301 may be prevented from rotating about the first vertical axis 321 when the rear frame section 320 is coupled to the first wing 301 by way of the hinge joint 325. It is contemplated that other rotatably releasable joints may be utilized.

Figure 8:
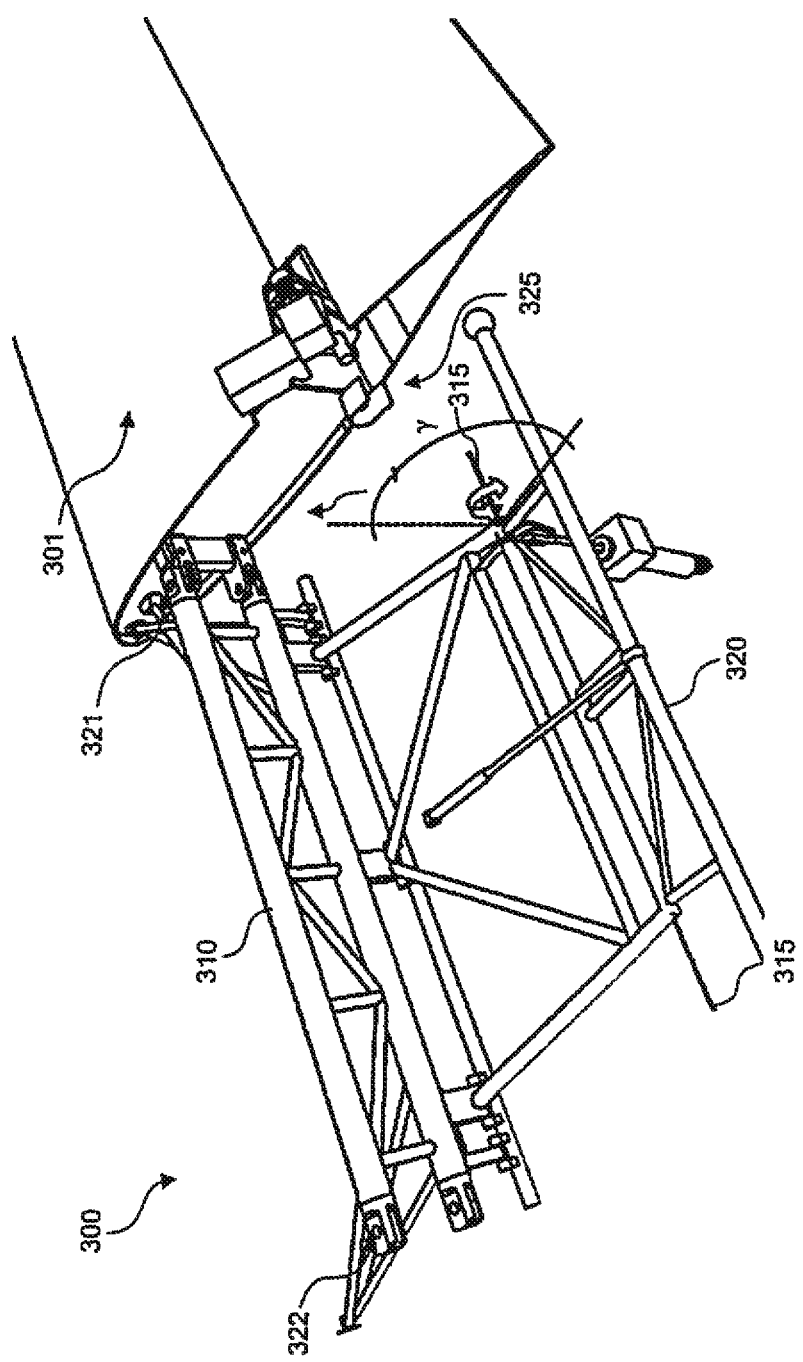
FIG. 8 is a portion of one embodiment of a central wing panel.

As shown in FIGS. 4 and 8, the rear frame section 320 is configured to rotate about a second horizontal axis 315 located at a lower portion of the rear frame section 320. The second horizontal axis 315 extends substantially parallel along the length of the rear frame section 320. The rear frame section 320 may be configured to rotate an angle γ about the second horizontal axis 315. Angle γ can be, for example, between about 0 and 80 degrees. Rotating the rear frame section 320 about the second horizontal axis 315 drops the rear frame section 320 below a lower surface of the first wing 301 and the second wing 302 (not shown) so that when the first wing 301 and the second wing 302 rotate toward one another about the first vertical axis 321 and the second vertical axis 322, the first wing 301 and the second wing 302 retract (e.g., when transitioning to ground mode) over rear frame section 320. According to an exemplary embodiment, one or more actuator mechanisms are configured to rotate the rear frame section 320 about the second horizontal axis 315. For example, a fourth actuator 344 as shown in FIG. 4 is configured to extend and retract to cause rotation of the rear frame section 320. The fourth actuator 344 is connected at one end to an upper member of the rear frame section 320 while the other end is connected to the structural frame (not shown).

As shown in FIG. 4, a third horizontal axis 316 extends along the length of the first wing 301 and the second wing 302. The first wing 301 is configured such that one or more ailerons 131 and flaps are configured to rotate about the third horizontal axis 316 such that the ailerons and flaps fold over onto the top front portion of the first wing 301 thereby reducing the depth of the first wing 301. The second wing 302 is equivalently constructed. Reducing the depth of the first wing 301 and the second wing 302 allows a reduced width of the wings 130 when retracted for ground operation mode. Ailerons 131 and the flaps are configured to be rotated about the third horizontal axis 316 by one or more actuator mechanisms. For example, a fifth actuator 345 is configured to rotate ailerons 131 and the flaps about the third horizontal axis 316 of the first wing 301. A sixth actuator 346 is configured to rotate ailerons 131 and the flaps about the third horizontal axis 316 of the second wing 302.

The actuators described herein may be electric, hydraulic, pneumatic, or other source know in the art. It is also contemplated that others mechanism may be utilized to cause rotation about the vertical and horizontal axis described herein. For example, gears, levers, cables, etc. The vehicle 100 is configured to operate each actuator individually and independently or two or more actuators could be synchronized in their operation. For example, according to one exemplary embodiment, the first actuator 341, the second actuator 342, and the third actuator 343 are configured to operate simultaneously for a period. In yet another embodiment, when transforming from air operation mode to ground operation mode the vehicle 100 is configured to actuate the fourth actuator 344, the fifth actuator 345, and the sixth actuator 346 prior to actuating the first actuator 341, the second actuator 342, and the third actuator 343. Conversely, when transforming from ground operation mode to air operation mode the vehicle 100 is configured to actuate the first actuator 341, the second actuator 342, and the third actuator 343 prior to the fourth actuator 344, the fifth actuator 345, and the sixth actuator 346.

Various modifications and variations can be made to the central wing panel and methods described herein. At the same time at proper positions of the wording, it is possible to substitute the term rotation by the term "turn" or "half-turn".

The invention claimed is:

1. A central wing panel for a flying vehicle comprising a body and wings positioned on each side of the body, the central wing panel comprising:
   a support structure configured for connection to the body substantially in line with a longitudinal axis of the body;
   a front transverse member at a front part of the support structure, and a rear transverse member at a rear part of the support structure, wherein the front and rear transverse members each have a substantially horizontal rotation axis perpendicular to the longitudinal axis of the body for rotation of the central wing panel;
   a wing support member connected to the front transverse member and rotatable about the rotation axis of the front transverse member, the wing support member provided with a wing pivot connectors by which a front part of each wing is connected to the wing support member, each wing pivotable around a substantially vertical axis of a respective connector between a first wing position in which the wing extends substantially horizontally from the body, and a second wing position in which the wing lies substantially horizontally parallel to the longitudinal axis of the body;

a wing locking member connected to the rear transverse member, the wing locking member movable by rotation about the rotation axis of the rear transverse member between a locked position, in which lock segments on the wing locking member engage with corresponding lock segments at a rear part of each wing to prevent movement of the wing from the first wing position to the second wing position, and a release position in which the lock segments are disengaged from the corresponding lock segments to allow movement of the wing between the first wing position and the second wing position; and a first actuator for pivoting the support structure about the rotation axis of the front transverse member to adjust an angle of incidence of the wings when in the first wing position.

2. The central wing panel of claim 1,
wherein the support structure comprises: a front frame section defining the front transverse member and wing support member, and a rear frame section, defining the rear transverse member and wing locking member, connected by one or more cross members; and
wherein the wing pivot connectors are positioned near opposite ends of the front frame section and the rear frame section is configured to rotate about the rotation axis of the rear transverse member between the locked position and the release position.

3. The central wing panel of claim 1, further comprising at least a second actuator for moving the wings between the first and second wing positions.

4. The central wing panel of claim 1, wherein the actuator is configured to rotate the support structure up to an angle of 15 degrees.

5. The central wing panel of claim 2, further comprising at least a third actuator coupled to the rear frame section and configured to rotate the rear frame section about the rotation axis of the rear transverse member.

6. The central wing panel of claim 5, wherein the third actuator is configured to rotate the rear frame section up to an angle of 80 degrees.

7. A flying vehicle comprising a body and wings positioned on each side of the body, wherein the wings are mounted on the body by means of a central wing panel according to claim 1.

8. A hybrid transportation vehicle for ground and air transportation, comprising a body, a cabin, a tail, a set of wheels including steerable wheels and driven wheels, an engine, a propeller, and wings positioned on each side of the body, wherein the wings are mounted on the body by means of a central wing panel according to claim 1.

9. The flying vehicle of claim 7, wherein each wing includes a set of ailerons and a set of flaps connected to a trailing edge of the wing, and wherein the ailerons and the flaps are configured to rotate about an axis extending along the trailing edge between a deployed position in which the ailerons and flaps extend from the trailing edge, and a folded position in which the ailerons and flaps overly an upper surface of the wing.

10. The flying vehicle of claim 9, further comprising at least one actuator for rotating the ailerons and flaps between the deployed position and the folded position.

11. A method of operating the flying vehicle of claim 7, wherein the wings are initially in the first wing position, the method comprising:
rotating the wing locking member from the locked position to the release position;
rotating each wing about a respective wing pivot connector of the wing between the first wing position and the second wing position;
operating the first actuator to tilt the support structure while the wings are moving between the first and second wing positions.

12. The method of claim 11, wherein each wing includes a set of ailerons and a set of flaps connected to a trailing edge of the wing, the method further comprising rotating the ailerons and the flaps about an axis extending along the trailing edge between a deployed position in which the ailerons and flaps extend from the trailing edge when the wing is initially in the first wing position, and a folded position in which the ailerons and flaps overly an upper surface of the wing when the wing begins to move to the second wing position.

13. A method of operating the flying vehicle of claim 7, wherein the wings are initially in the second wing position, the method comprising:
rotating each wing about a respective wing pivot connector of the wing between the second wing position and the first wing position;
operating the actuator to tilt the support structure while the wings are moving between the second and first wing positions; and
rotating the wing locking member from the release position to the locked position.

14. The method of claim 13, wherein each wing includes a set of ailerons and a set of flaps connected to a trailing edge of the wing, the method further comprising: rotating the ailerons and the flaps about an axis extending along the trailing edge between a folded position in which the ailerons and flaps overly an upper surface of the wing when the wing is in the second wing position, and a deployed position in which the ailerons and flaps extend from the training edge when the wing is moved to the first wing position.

15. The method of claim 13, further comprising following movement of the wings to the first wing position, operating the first actuator to tilt the support structure so as to adjust the incidence of the wings to a predetermined angle of attack in a direction of travel of the flying vehicle.

16. The method of claim 11, further comprising operating the first actuator to tilt the support structure while the wings are moving between the first and second wing positions so that the wings clear any vertical tail sections of the vehicle when moving between the first and second wing positions.

* * * * *